US011861021B2

(12) United States Patent
Tang

(10) Patent No.: US 11,861,021 B2
(45) Date of Patent: Jan. 2, 2024

(54) DIGITAL ARTWORK DISPLAY DEVICE, MANAGEMENT METHOD, AND ELECTRONIC DEVICE

(71) Applicant: BOE TECHNOLOGY GROUP CO., LTD., Beijing (CN)

(72) Inventor: Xiaojun Tang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 619 days.

(21) Appl. No.: 17/042,421

(22) PCT Filed: Jan. 22, 2020

(86) PCT No.: PCT/CN2020/073678
§ 371 (c)(1),
(2) Date: Sep. 28, 2020

(87) PCT Pub. No.: WO2020/156400
PCT Pub. Date: Aug. 6, 2020

(65) Prior Publication Data
US 2021/0019430 A1   Jan. 21, 2021

(30) Foreign Application Priority Data
Jan. 30, 2019 (CN) .......................... 201910093884.2

(51) Int. Cl.
*G06F 21/60* (2013.01)
*H04L 9/14* (2006.01)
*G06F 3/14* (2006.01)

(52) U.S. Cl.
CPC .............. *G06F 21/602* (2013.01); *H04L 9/14* (2013.01); *G06F 3/14* (2013.01)

(58) Field of Classification Search
CPC .......... G06F 21/602; G06F 3/14; G06F 21/84; G06F 21/10; G06F 21/64; H04L 9/14;
(Continued)

(56) References Cited
U.S. PATENT DOCUMENTS 6,389,403 B1 * 5/2002 Dorak, Jr. ........... H04L 63/0428
705/52
11,347,785 B2 * 5/2022 Klein, Jr. .............. H04L 67/306
(Continued)

FOREIGN PATENT DOCUMENTS

CN   101833623 A   9/2010
CN   103020492 A   4/2013
(Continued)

OTHER PUBLICATIONS

Extended European Search Report from European Patent Application No. 20748756.2 dated Sep. 27, 2022.
(Continued)

*Primary Examiner* — Abiy Getachew
(74) *Attorney, Agent, or Firm* — Dilworth & Barrese, LLP.; Michael J. Musella, Esq.

(57) ABSTRACT

A digital artwork display device, a digital artwork management method, and an electronic device are provided. The digital artwork display device includes a registration circuit, a transaction circuit, and a file decryption circuit. The registration circuit is configured to apply for a device identifier and a device public-private key pair, and the device public-private key pair includes a device public key and a device private key. The transaction circuit is configured to acquire a use license, and the use license includes the device identifier and a content key ciphertext obtained by encrypting a content key by using the device public key. The file decryption circuit is configured to decrypt the content key ciphertext in the use license by using the device private key to obtain the content key, and decrypt an encrypted file by using the content key to obtain an original file.

20 Claims, 7 Drawing Sheets

(58) Field of Classification Search
CPC . H04L 2209/60; H04L 9/0825; H04L 9/3247; G06Q 20/38; G06Q 20/3825
See application file for complete search history.

(56) References Cited

U.S. PATENT DOCUMENTS

| | | | | |
|---|---|---|---|---|
| 2008/0313264 | A1* | 12/2008 | Pestoni | G06F 21/10 709/202 |
| 2011/0219236 | A1* | 9/2011 | Wang | G06F 21/10 713/176 |
| 2013/0173912 | A1* | 7/2013 | Cui | H04L 9/0825 713/175 |

FOREIGN PATENT DOCUMENTS

| | | |
|---|---|---|
| CN | 103186720 A | 7/2013 |
| CN | 102224506 B | 12/2014 |
| CN | 106940760 A | 7/2017 |
| EP | 2359291 B1 | 8/2016 |

OTHER PUBLICATIONS

Wang et al., "A Study for License Distribution of Mechanism using Accumulated Device Identifier in DRM system," 2007, pp. 1-6, International Conference on Multimedia and Ubiquitous Engineering, pp. 1118-1123.

* cited by examiner generating a use license and sending the use license to a requesting device — S201

DIGITAL ARTWORK DISPLAY DEVICE, MANAGEMENT METHOD, AND ELECTRONIC DEVICE

The present application claims the priority of Chinese patent application No. 201910093884.2, filed on Jan. 30, 2019, the entire disclosure of which is incorporated herein by reference as part of the disclosure of this application.

TECHNICAL FIELD

Embodiments of the present disclosure relate to a digital artwork display device, a digital artwork management method, and an electronic device.

BACKGROUND

Mobile digital publication is a publishing model based on mobile communication technology, and the mobile digital publication has better mobility, privacy, speed, intelligence, and interactivity, and meets people's demands for instant and massive information. With the development of mobile data value-added services and continuous improvement of the performance of the mobile terminal such as the smartphone, the palmtop, the e-reader, and the digital painted screen, the mobile digital publication (for example, the publication of electronic works such as digital paintings, mobile TVs, e-books, etc.) has been increasingly used.

SUMMARY

At least one embodiment of the present disclosure provides a digital artwork display device, which comprises a registration unit, a transaction unit, and a file decryption unit. The registration unit is configured to apply for a device identifier and a device public-private key pair, and the device public-private key pair comprises a device public key and a device private key that is corresponding to the device public key. The transaction unit is configured to acquire a use license, and the use license comprises the device identifier and a content key ciphertext obtained by encrypting a content key by using the device public key. The file decryption unit is configured to decrypt the content key ciphertext in the use license by using the device private key so as to obtain the content key, and decrypt an encrypted file that is obtained by using the content key so as to obtain an original file.

For example, the digital artwork display device provided by an embodiment of the present disclosure further comprises a file acquisition unit, and the file acquisition unit is configured to acquire the encrypted file.

For example, in the digital artwork display device provided by an embodiment of the present disclosure, the transaction unit comprises a transaction credential acquisition unit and a license acquisition unit. The transaction credential acquisition unit is configured to request and acquire a transaction credential, and the transaction credential comprises the device identifier; and the license acquisition unit is configured to request and acquire the use license by using the transaction credential.

For example, in the digital artwork display device provided by an embodiment of the present disclosure, the transaction credential acquisition unit is further configured to perform a payment operation.

For example, in the digital artwork display device provided by an embodiment of the present disclosure, the transaction credential further comprises a content identifier of the encrypted file and a transaction credential digital signature.

For example, in the digital artwork display device provided by an embodiment of the present disclosure, the use license further comprises a content identifier of the encrypted file and a license digital signature.

For example, in the digital artwork display device provided by an embodiment of the present disclosure, the license digital signature is generated by using a license private key, and the license acquisition unit is further configured to verify the license digital signature by using a license public key corresponding to the license private key.

For example, the digital artwork display device provided by an embodiment of the present disclosure further comprises an output unit, and the output unit is configured to output the original file.

At least one embodiment of the present disclosure further provides a digital artwork management method for a digital artwork display device. The digital artwork display device is assigned a device identifier, and the digital artwork management method comprises: acquiring a use license, in which the use license comprises the device identifier and a content key ciphertext obtained by encrypting a content key by using a device public key; and decrypting the content key ciphertext by using a device private key corresponding to the device public key so as to obtain the content key, and decrypting an encrypted file that is obtained by using the content key so as to obtain an original file.

For example, the digital artwork management method provided by an embodiment of the present disclosure further comprises: acquiring the encrypted file.

For example, the digital artwork management method provided by an embodiment of the present disclosure further comprises: applying for the device identifier and a device public-private key pair. The device public-private key pair comprises the device public key and the device private key.

For example, in the digital artwork management method provided by an embodiment of the present disclosure, acquiring the use license comprises: requesting and acquiring a transaction credential, in which the transaction credential comprises the device identifier; and requesting and acquiring the use license by using the transaction credential.

At least one embodiment of the present disclosure further provides an electronic device, which comprises a license generation unit. The license generation unit is configured to generate a use license and send the use license to a requesting device. The use license comprises a device identifier of the requesting device, a content identifier of an encrypted file, and a first content key ciphertext obtained by encrypting a content key by using a device public key, and the content key corresponds to the encrypted file.

For example, the electronic device provided by an embodiment of the present disclosure further comprises a transaction processing unit. The transaction processing unit is configured to receive a transaction request of the requesting device, generate a transaction credential according to the transaction request, and send the transaction credential to the requesting device. The transaction request comprises the device identifier, and the transaction credential comprises the device identifier.

For example, in the electronic device provided by an embodiment of the present disclosure, the transaction credential further comprises the content identifier and a transaction credential digital signature, and the transaction credential digital signature is generated by using a transaction credential private key; and the license generation unit is further configured to receive the transaction credential from the requesting device and verify the transaction credential digital signature by using a transaction credential public key corresponding to the transaction credential private key.

For example, the electronic device provided by an embodiment of the present disclosure further comprises a content key library. The license generation unit is further configured to acquire a second content key ciphertext obtained by encrypting the content key by using a service public key from the content key library, decrypt the second content key ciphertext by using a service private key corresponding to the service public key so as to obtain the content key, and encrypt the content key by using the device public key so as to obtain the first content key ciphertext, thereby obtaining the use license.

For example, the electronic device provided by an embodiment of the present disclosure further comprises a device identifier assignment unit. The device identifier assignment unit is configured to receive an application of the requesting device, and assign the device identifier and a device public-private key pair that are corresponding to the requesting device, and the device public-private key pair comprises the device public key and a device private key corresponding to the device public key.

At least one embodiment of the present disclosure further provides a digital artwork management method, which comprises: generating a use license and sending the use license to a requesting device. The use license comprises a device identifier of the requesting device, a content identifier of an encrypted file, and a first content key ciphertext obtained by encrypting a content key by using a device public key, and the content key corresponds to the encrypted file.

For example, the digital artwork management method provided by an embodiment of the present disclosure further comprises: receiving a transaction request of the requesting device, generating a transaction credential according to the transaction request, and sending the transaction credential to the requesting device. The transaction request comprises the device identifier, and the transaction credential comprises the device identifier.

For example, the digital artwork management method provided by an embodiment of the present disclosure further comprises: receiving the transaction credential from the requesting device, and verifying a transaction credential digital signature in the transaction credential.

For example, in the digital artwork management method provided by an embodiment of the present disclosure, generating the use license comprises: acquiring a second content key ciphertext obtained by encrypting the content key by using a service public key, and decrypting the second content key ciphertext by using a service private key corresponding to the service public key so as to obtain the content key; and encrypting the content key by using the device public key so as to obtain the first content key ciphertext, thereby obtaining the use license.

At least one embodiment of the present disclosure further provides an electronic device, which comprises: a processor; and a memory which comprises one or more computer program modules. The one or more computer program modules are stored in the memory and configured to be executed by the processor, and the one or more computer program modules comprise instructions for implementing the digital artwork management method provided by any one of the embodiments of the present disclosure.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

Figure 1:
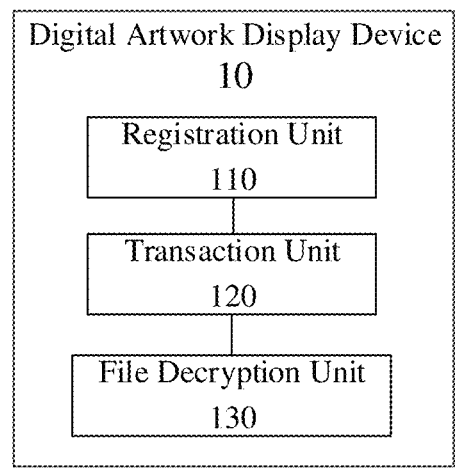
FIG. 1 is a schematic block diagram of a digital artwork display device provided by some embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first", "second", etc., which are used in the description and the claims of the present application for disclosure, are not intended to indicate any sequence, amount or importance, but distinguish various components. The terms "comprise", "comprising", "include", "including", etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On", "under", "right", "left" and the like are only used to indicate relative position relationship, and when the position of the object which is described is changed, the relative position relationship may be changed accordingly.

With the rapid development of computer and internet technology, it becomes more and more easy to illegally produce, store, distribute, copy, modify, and trade digital works without permission, thereby bringing losses to copyright owners of digital works. Therefore, the issue of copyright protection of digital works becomes more and more important.

Digital works include, for example, digital paintings, music, videos, etc. The digital paintings can be various types of pictures, including photos taken by digital cameras, digital copies of paper-based calligraphy and painting (such as scanning copies), machine-generated works (such as images generated by artificial intelligence (AI)), etc. For example, a painting transaction management system of a painted screen platform is used for transaction management of digital paintings. Because digital content is vulnerable to network monitoring and illegal copying and distribution, an effective copyright protection system is needed to protect digital paintings during transmission and storage, so as to prevent piracy.

For example, a common digital rights management (DRM) system can be used to encrypt/decrypt digital content with encryption algorithm to ensure the security of the transmission process. However, in the common DRM system, for each mobile terminal device (such as a painted screen, a digital photo frame, a mobile phone, a tablet computer, etc.), the digital content is usually encrypted by using the same key, and a certain mobile terminal device can easily transmit the content key to other mobile terminal devices for usage after obtaining the decrypted content key, which leads to unauthorized devices acquiring the digital content (such as digital paintings), and thus the security is poor.

At least one embodiment of the present disclosure provides a digital artwork display device, an electronic device, and a digital artwork management method. The digital artwork display device can achieve high security where one device corresponds to one key, thereby preventing unauthorized devices from acquiring digital files (for example, digital artwork files). In addition, some embodiments of the present disclosure further solve the problem of high coupling degree between transaction services and license services in the traditional digital copyright management system, thereby improving maintainability of the system, and implementing the efficient distribution of digital files (for example, digital artwork files).

Hereinafter, the embodiments of the present disclosure will be described in detail with reference to the drawings. It should be noted that the same reference numerals in different drawings are used to refer to the same elements that have been described.

At least one embodiment of the present disclosure provides a digital artwork display device, and the digital artwork display device includes a registration unit, a transaction unit, and a file decryption unit. The registration unit is configured to apply for a device identifier and a device public-private key pair, the device public-private key pair includes a device public key and a device private key that is corresponding to the device public key. The transaction unit is configured to acquire a use license, and the use license includes the device identifier and a content key ciphertext obtained by encrypting a content key by using the device public key. The file decryption unit is configured to decrypt the content key ciphertext in the use license by using the device private key so as to obtain the content key, and decrypt an encrypted file that is obtained by using the content key so as to obtain an original file.

FIG. 1 is a schematic block diagram of a digital artwork display device provided by some embodiments of the present disclosure. As illustrated in FIG. 1, a digital artwork display device 10 includes a registration unit 110, a transaction unit 120, and a file decryption unit 130. According to needs, the digital artwork display device 10 may further include a computing device (for example, a central processing unit), a storage device, a communication device (for example, a wireless communication device or a wired communication device), a modem, a radio frequency device, an encoding and decoding device, a display device (for example, a liquid crystal display panel, an organic light-emitting diode display panel, a projection device, or the like), an input device (for example, a keyboard, a button, a mouse, a touch screen, or the like), a data transmission interface (for example, an HDMI interface, a USB interface, etc., so that other output devices and storage devices can be connected), a speaker, etc., and the embodiments of the present disclosure are not limited in this aspect. The digital artwork display device 10 is, for example, applied to the scenario illustrated in FIG. 2. For example, the digital artwork display device 10 is a painted screen 01, which can be connected to the internet through wireless means or wired means, and digital paintings can be purchased and can be displayed by a display device of the painted screen 01. Each unit in the digital artwork display device 10 is described in detail below with reference to the application scenario illustrated in FIG. 2.

The registration unit 110 is configured to apply for a device identifier (DID) and a device public-private key pair. For example, the device identifier is in one-to-one correspondence with the digital artwork display device 10, and different devices correspond to different device identifiers. For example, the device identifier may be a character string including numbers, letters (uppercase or lowercase), or special characters. For example, the device identifier may be an international mobile equipment identity (IMEI), a product serial number, a media access control (MAC) address, etc., of the digital artwork display device 10, or may be obtained by performing a predetermined operation thereon, and for example, the device identifier may be obtained by performing a hash operation with the IMEI, the product serial number or the MAC. The device identifier may be, for example, incorporated into data related to the digital artwork display device 10, so as to identify, verify, and determine the digital artwork display device 10 in transaction, permission and other affairs, and the related data may be, for example, a transaction credential and a use license. The device identifier is also in one-to-one correspondence with the device public-private key pair assigned to the digital artwork display device 10, so the device identifier can be stored in association with the device public-private key pair when storing the device public-private key pair. For example, the device public-private key pair includes a device public key and a device private key that is corresponding to the device public key, and the device public key and the device private key can be used to encrypt or decrypt digital content. The device public-private key pair is also in one-to-one correspondence with the digital artwork display device 10, and different devices correspond to different device public-private key pairs. For example, after the digital artwork display device 10 applies for the device public-private key pair, the device private key is stored in the digital artwork display device 10 (for example, the storage device of the digital artwork display device 10) to facilitate subsequent decryption of the digital content, and the device private key can be stored, for example, in a secure region specifically divided by the system to achieve a higher level of protection. For example, the device public-private key pair adopts an asymmetric encryption algorithm, such as the RSA1024 or RSA2048 algorithm, and other applicable algorithms may also be adopted, which is not limited in the embodiments of the present disclosure.

Figure 2:
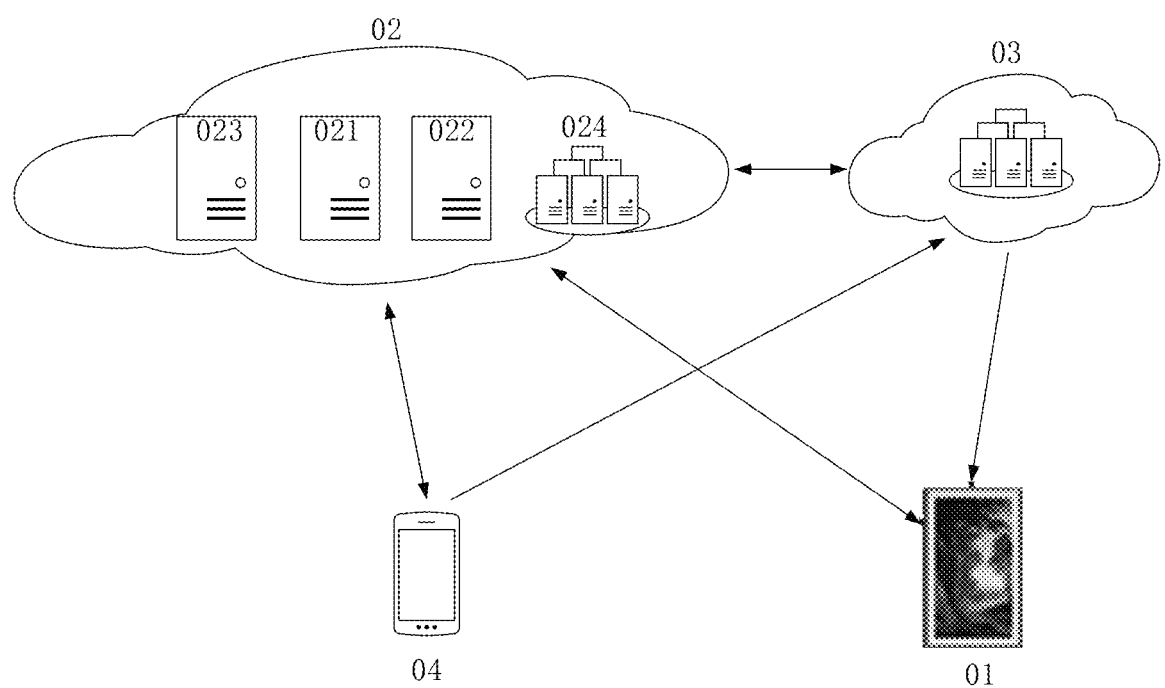
FIG. 2 is a schematic diagram of an application scenario of a digital artwork display device provided by some embodiments of the present disclosure.

In the case where the digital artwork display device 10 is the painted screen 01 illustrated in FIG. 2 and the painted screen 01 is connected to a communication network, the registration unit 110 in the painted screen 01 can apply to a first server 02 for the device identifier and the device public-private key pair. For example, a DRM unit 021 in the first server 02 responds to the application of the painted screen 01, assigns the device identifier and the device public-private key pair for the painted screen 01, and transmits the device identifier and the device private key in the device public-private key pair that are assigned to the painted screen 01, so that the device identifier and the device private key can be stored in the painted screen 01. For example, the painted screen 01 and the first server 02 communicate with each other through a communication network (for example, any suitable network such as a wired LAN, a wireless LAN, a 3G/4G/5G communication network, etc.) and based on a corresponding communication protocol, so as to transmit data.

For example, in an example, the first server 02 may be a server cluster, and the DRM unit 021 may be a DRM server. Of course, the embodiments of the present disclosure are not limited to this case, the first server 02 may also be a separate server, and the DRM unit 021 may be a DRM service process running in the separate server. For example, the first server 02 may also be a virtual server and run on any physical device or private cloud. For the specific implementation of the first server 02, the embodiments of the present disclosure are not limited in this aspect.

The transaction unit 120 is configured to acquire a use license. For example, the use license includes the device identifier of the digital artwork display device 10 and a content key ciphertext obtained by encrypting a content key by using the device public key. For example, the content key is used to decrypt an encrypted file (for example, a digital artwork file, such as a digital painting) that is obtained subsequently, and the content key is described in detail below and is not described in detail here. For example, after performing a payment operation, the transaction unit 120 acquires the use license, which is, for example, a digital file in a specific form. For example, the payment operation includes payment of a fee, which can be paid by the transaction unit 120 through electronic fund transfer. For example, the payment operation is realized through a payment service provided by a third party (for example, a bank, Alipay, WeChat Pay, etc.). The fee is used, for example, to purchase digital paintings, which can be in either actual currency (for example, RMB, US dollar, etc.) or various tokens (for example, Bitcoin, point, QQ coin, etc.).

In the case where the digital artwork display device 10 is the painted screen 01 illustrated in FIG. 2 and the painted screen 01 is connected to the communication network, the transaction unit 120 in the painted screen 01 can acquire the use license issued by the first server 02. For example, a license service unit 022 in the first server 02 generates the use license and transmits the use license to the painted screen 01. Similar to the DRM unit 021, the license service unit 022 may be a license server, a license service process, or the like, which is not limited in the embodiments of the present disclosure.

The file decryption unit 130 is configured to decrypt the content key ciphertext in the use license by using the device private key so as to obtain the content key, and decrypt an encrypted file that is obtained by using the content key so as to obtain an original file. The original file is, for example, a digital artwork file, such as a painting. Because the content key ciphertext is obtained by encrypting the content key by using the device public key, and the device public key corresponds to the digital artwork display device 10, only the corresponding device private key can decrypt the content key ciphertext. In combination with the unique device identifier corresponding to the digital artwork display device 10, in this way, it can be ensured that the use license issued to the digital artwork display device 10 can only be decrypted by the digital artwork display device 10 so as to obtain the content key, and even if other device acquires the use license through improper ways, the other device cannot pass the verification and decrypt the use license, so the content key cannot be obtained. Therefore, the digital artwork display device 10 can achieve high security where one device corresponds to one key. For example, the digital artwork display device 10 can acquire the encrypted file from another server (for example, a storage server or a public cloud, etc.), and the encrypted file is obtained by encrypting the original file by using the content key. After obtaining the content key, the file decryption unit 130 decrypts the encrypted file by using the content key combining with the unique device identifier corresponding to the digital artwork display device 10, so that the original file can be obtained.

In the case where the digital artwork display device 10 is the painted screen 01 illustrated in FIG. 2 and the painted screen 01 is connected to the communication network, the painted screen 01 can acquire the encrypted file from a second server 03, or the painted screen 01 can acquire the encrypted file through other peripheral devices (for example, acquiring from other storage devices through an HDMI interface or a USB interface). The file decryption unit 130 in the painted screen 01 can decrypt the use license that is obtained so as to obtain the content key, and then decrypt the encrypted file by using the content key, thereby obtaining the original file. The original file is, for example, a digital painting, so that the painted screen 01 can display the digital painting through the display device in the painted screen 01. Similar to the first server 02, the second server 03 may be a server cluster, a separate server or a virtual server, or may be a public cloud, which is not limited in the embodiments of the present disclosure.

Figure 3:
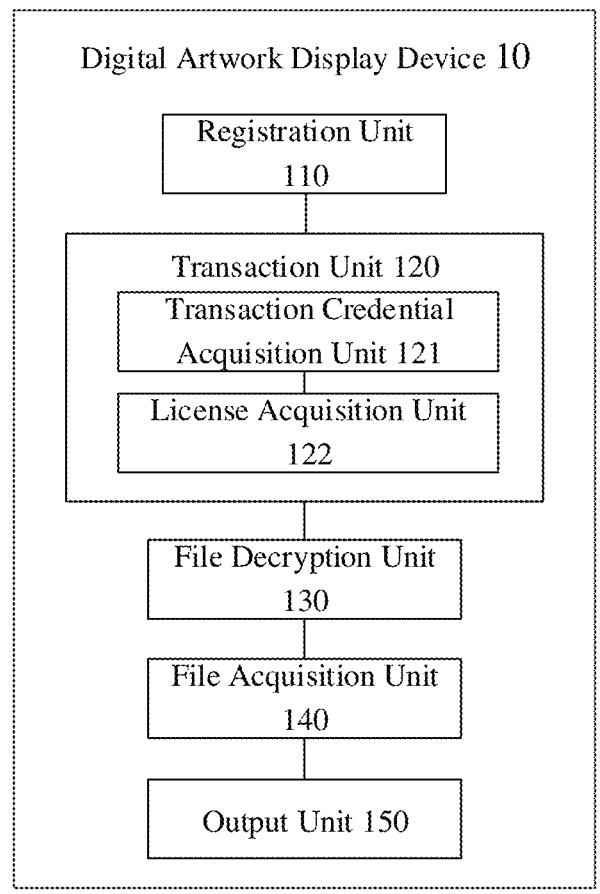
FIG. 3 is a schematic block diagram of another digital artwork display device provided by some embodiments of the present disclosure.

FIG. 3 is a schematic block diagram of another digital artwork display device provided by some embodiments of the present disclosure. As illustrated in FIG. 3, the digital artwork display device 10 further includes a file acquisition unit 140 and an output unit 150. The transaction unit 120 of the digital artwork display device 10 includes a transaction credential acquisition unit 121 and a license acquisition unit 122. The other structures in the digital artwork display device 10 are basically the same as the digital artwork display device 10 illustrated in FIG. 1.

The file acquisition unit 140 is configured to acquire the encrypted file. For example, the encrypted file is stored in another server (for example, a storage server or a public cloud, etc.). The file acquisition unit 140 communicates with the server through a communication network and based on a corresponding communication protocol, submits a file acquisition request, and receives the file transmitted by the server after the request is passed by the server, thereby acquiring the encrypted file. The encrypted file is, for example, obtained by encrypting the original file by using the content key. Because the encrypted file is encrypted, even if other device acquires the encrypted file, the other device cannot decrypt the encrypted file because absence of content key (and the corresponding device identifier), which may not cause leak of the original file.

In the case where the digital artwork display device 10 is the painted screen 01 illustrated in FIG. 2 and the painted screen 01 is connected to the communication network, the file acquisition unit 140 of the painted screen 01 can acquire the encrypted file from the second server 03. For example, the encrypted file can be acquired by downloading directly from a link, or by file transfer protocol (FPT). The second server 03 is, for example, a storage server or a public cloud, and can allow any device to download the stored encrypted file.

The output unit 150 is configured to output the original file. For example, the output unit 150 may be a display panel, a speaker, etc., so as to display or play the original file. For example, the original file may be a digital artwork file, such as digital painting, video, audio, e-book, etc., which is not limited in the embodiments of the present disclosure.

In the case where the digital artwork display device 10 is the painted screen 01 illustrated in FIG. 2, the output unit 150 of the painted screen 01 may be a display panel, which is used to display the digital painting. For example, the display panel can switch to display a plurality of digital paintings at a predetermined time interval, or display a plurality of digital paintings simultaneously in different regions, or display one single digital painting fixedly, or display the digital painting in other ways. The embodiments of the present disclosure are not limited in this aspect.

The transaction credential acquisition unit 121 is configured to request and acquire a transaction credential. For example, the transaction credential may be a token and generated by using a token mechanism. The transaction credential includes the device identifier of the digital artwork display device 10 and may also include the content identifier (CID) of the encrypted file, a uses-permission, and a transaction credential digital signature. The transaction credential digital signature is generated by using, for example, a transaction credential private key, so as to prevent illegal users from forging and tampering with the content of the transaction credential.

For example, the transaction credential acquisition unit 121 is further configured to perform a payment operation. For example, the payment operation includes payment of a fee, which can be paid by the transaction credential acquisition unit 121 through electronic fund transfer, and the fee is, for example, used to purchase digital paintings. After the transaction credential acquisition unit 121 performs the payment operation, the transaction credential can be acquired. It should be noted that the payment operation can also be performed by other units (for example, an online banking application, etc.) in the digital artwork display device 10. For example, the transaction credential acquisition unit 121 enables other units to perform the payment operation in the calling way and return the result of the payment operation to the transaction credential acquisition unit 121, and the specific implementation of the payment operation is not limited in the embodiments of the present disclosure.

In the case where the digital artwork display device 10 is the painted screen 01 illustrated in FIG. 2 and the painted screen 01 is connected to the communication network, the transaction credential acquisition unit 121 of the painted screen 01 can pay a fee to a transaction management unit 023 in the first server 02 and request the transaction credential. The transaction management unit 023 generates the transaction credential after receiving the fee paid by the painted screen 01 and sends the transaction credential to the painted screen 01. The transaction credential includes, for example, the device identifier of the painted screen 01, the content identifier of the purchased digital painting, the uses-permission, and a transaction credential digital signature. The transaction credential digital signature is generated by using, for example, the transaction credential private key stored in the transaction management unit 023. For example, the transaction management unit 023 may be a transaction management server, a transaction management process, or the like. The embodiments of the present disclosure are not limited in this aspect.

The license acquisition unit 122 is configured to request and acquire the use license by using the transaction credential. For example, the license acquisition unit 122 sends the transaction credential to other server to request the use license. After the other server verifies the integrity of the transaction credential, the use license is generated, and the use license is sent to the license acquisition unit 122. For example, the other server mentioned above may be the same server as the server implementing the transaction credential acquisition unit 121, or may be a different server from the server implementing the transaction credential acquisition unit 121, which is not limited in the embodiments of the present disclosure. For example, the use license includes the device identifier of the digital artwork display device 10, and also includes the content identifier of the encrypted file and a license digital signature. For example, the license digital signature is generated by using the license private key, and the license acquisition unit 122 is further configured to verify the integrity of the license digital signature by using a license public key corresponding to the license private key after acquiring the use license. The license public key is stored in the digital artwork display device 10 (for example, the storage device of the digital artwork display device 10), and for example, the license public key can be stored in a secure region specifically divided by the system to achieve a higher level of protection.

In the case where the digital artwork display device 10 is the painted screen 01 illustrated in FIG. 2 and the painted screen 01 is connected to the communication network, the license acquisition unit 122 of the painted screen 01 sends the acquired transaction credential to the license service unit 022 in the first server 02. After receiving the transaction credential, the license service unit 022 verifies the integrity of the transaction credential digital signature by using a transaction credential public key, and the transaction credential public key is stored in the license service unit 022. In the case where the verification is passed, the license service unit 022 acquires a corresponding content key from a content key database 024 in the first server 02 according to the content identifier of the digital painting in the transaction credential, and then encrypts the content key by using the device public key corresponding to painted screen 01 according the device identifier corresponding to the painted screen 01 in the transaction credential, thereby generating the use license and sending the use license to the license acquisition unit 122 of the painted screen 01.

For example, the content key database 024 may adopt an appropriate database form, such as a relational database or a non-relational database. For example, the content key database 024 can run on the same computer or server as the DRM unit 021, the license service unit 022, or the transaction management unit 023, or separately run on a database server in a local area network, or run on a database server (such as a cloud server) in the internet, and the embodiments of the present disclosure are not limited in this aspect.

After acquiring the use license, the file decryption unit 130 in the digital artwork display device 10 extracts the content key ciphertext from the use license after verifying the use license with the device identifier, and the content key ciphertext is subsequently decrypted by using the device private key stored in the digital artwork display device 10 so as to obtain the content key. Because the device public key and the device private key are in one-to-one correspondence with the digital artwork display device 10, the use license is equivalent to being bound to the digital artwork display device 10. Even if other devices acquire the use license through improper ways, the other devices cannot obtain the content key by decrypting because of absence of the device identifier and the device private key. Thus, the digital artwork display device 10 can achieve high security where one device corresponds to one key, thereby preventing unauthorized devices from acquiring the content key, and thus preventing unauthorized devices from acquiring digital files (for example, digital artwork files, such as digital paintings) by using the content key.

The digital artwork display device 10 adopts the token mechanism to issue the use license, so that the transaction management unit 023 and the license service unit 022 in the first server 02 are relatively independent from each other, thereby solving the problem of high coupling degree between the transaction services and the license services in the traditional digital copyright management system, and improving the maintainability of the system. The encrypted file is stored in the second server 03. The second server 03 is, for example, a public cloud, and any device can acquire the encrypted file from the second server 03. Due to the use of the token mechanism, the device identifier, and the device public-private key pair, the encrypted file cannot be illegally decrypted in the case where the public cloud is used to store and distribute the encrypted file. Therefore, the public cloud resources can be used to achieve efficient distribution, thereby improving the transaction efficiency.

It should be noted that the digital artwork display device 10 is not limited to include the units described above, and may further include more units to achieve more comprehensive functions. Each unit can be implemented as hardware, firmware, or software modules, and these software modules can be run in the digital artwork display device 10 to provide corresponding application programs or service processes, which are not limited in the embodiments of the present disclosure. The digital artwork display device 10 is not limited to the painted screen 01, but can also be other devices, such as a video play device, an audio play device, an e-book reading device, etc. Correspondingly, the above-described original file can be a digital artwork file such as a video, an audio, an e-book, etc. The embodiments of the present disclosure are not limited in this aspect.

At least one embodiment of the present disclosure further provides a digital artwork management method for a digital artwork display device. The digital artwork management method can achieve high security where one device corresponds to one key, thereby preventing unauthorized devices from acquiring digital files (for example, digital artwork files). In addition, some embodiments of the present disclosure also solve the problem of high coupling degree between transaction services and license services in the traditional digital copyright management system, thereby improving the maintainability of the system, and implementing the efficient distribution of digital files (for example, digital artwork files).

Figure 4:
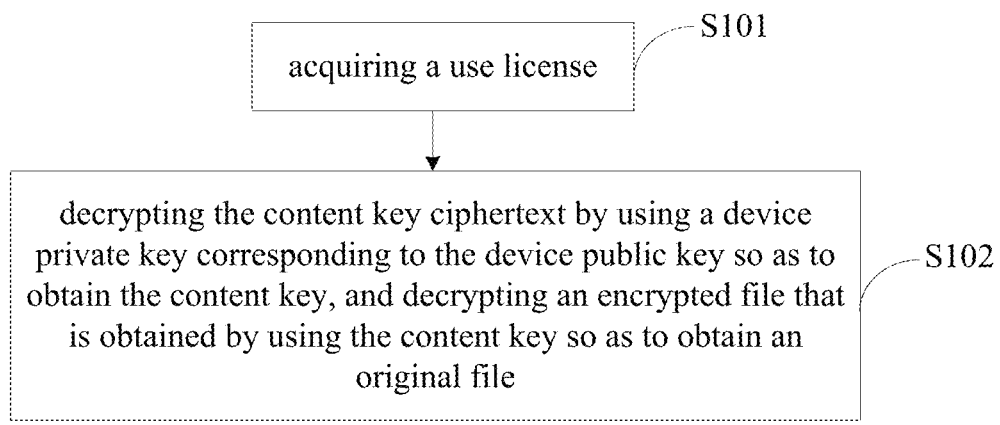
FIG. 4 is a schematic flowchart of a digital artwork management method provided by some embodiments of the present disclosure.

FIG. 4 is a schematic flowchart of a digital artwork management method provided by some embodiments of the present disclosure. The digital artwork management method is, for example, used for a digital artwork display device, and the digital artwork display device is assigned a device identifier. For example, the digital artwork management method can be used for the digital artwork display device 10 illustrated in FIG. 1 or FIG. 3. As illustrated in FIG. 4, the digital artwork management method includes following steps.

Step S101: acquiring a use license.

Step S102: decrypting a content key ciphertext by using a device private key corresponding to a device public key so as to obtain a content key, and decrypting an encrypted file that is obtained by using the content key so as to obtain an original file.

For example, in step S101, the use license includes the device identifier and the content key ciphertext obtained by encrypting the content key by using the device public key. The device identifier is in one-to-one correspondence with the digital artwork display device 10, and different devices correspond to different device identifiers. For example, the device identifier is applied and obtained by the digital artwork display device 10 before performing the digital artwork management method. For example, the device public key is also in one-to-one correspondence with the digital artwork display device 10, and different devices correspond to different device public keys. Accordingly, the device private key corresponding to the device public key is also in one-to-one correspondence with the digital artwork display device 10, and the corresponding device private key is stored in the digital artwork display device 10. The device public key and the device private key may adopt an asymmetric encryption algorithm, such as the RSA1024 or RSA2048 algorithm, or other applicable algorithms, which is not limited in the embodiments of the present disclosure. For example, the content key is used to subsequently decrypt the encrypted file that is acquired, and the content key may adopt AES128, AES256, or other applicable cryptographic algorithms Step S101 can be performed by, for example, the transaction unit 120 of the digital artwork display device 10 illustrated in FIG. 1 or FIG. 3, and the related description can be referred to the foregoing content, which is not repeated here.

For example, step S101 may further include following steps.

Step S1011: requesting and acquiring a transaction credential.

Step S1012: requesting and acquiring the use license by using the transaction credential.

For example, in step S1011, the transaction credential may be a token and generated by using a token mechanism. The transaction credential includes the device identifier of the digital artwork display device 10 and may also include the content identifier of the encrypted file, a uses-permission, and a transaction credential digital signature. The transaction credential digital signature is generated by using, for example, a transaction credential private key, so as to prevent illegal users from forging and tampering with the content of the transaction credential. For example, the transaction credential can be requested and acquired by performing a payment operation. Step S1011 may be performed by, for example, the transaction credential acquisition unit 121 of the digital artwork display device 10 illustrated in FIG. 2, and the related description can be referred to the foregoing content, which is not repeated here.

For example, in step S1012, the transaction credential can be sent to other server to request the use license. After the other server verifies the integrity of the transaction credential, the use license is generated, and the use license is sent to the digital artwork display device 10. For example, the other server mentioned above may be the same server as the server which is used to issue the transaction credential, or may be a different server from the server which is used to issue the transaction credential, which is not limited in the embodiments of the present disclosure. For example, the use license may also include the content identifier of the encrypted file and a license digital signature. For example, the license digital signature is generated by using a license private key, and the digital artwork display device 10 can verify the license digital signature by using a license public key corresponding to the license private key after acquiring the use license. The license public key is stored in the digital artwork display device 10 (for example, the storage device of the digital artwork display device 10). Step S1012 may be performed by, for example, the license acquisition unit 122 of the digital artwork display device 10 illustrated in FIG. 3, and the related description can be referred to the foregoing content, which is not repeated here.

For example, as illustrated in FIG. 4, in step S102, the content key ciphertext is decrypted by using the device private key stored in the digital artwork display device 10, thereby obtaining the content key. For example, the digital artwork display device 10 can acquire the encrypted file from other server (for example, a storage server, a public cloud, or the like), and the encrypted file is obtained by encrypting the original file by using the content key. The original file is, for example, a digital artwork file, such as a digital painting. Therefore, after the content key is obtained, the encrypted file can be decrypted by using the content key, so that the original file can be obtained. Because the content key ciphertext is obtained by encrypting the content key by using the device public key, and the device public key corresponds to the digital artwork display device 10, only the corresponding device private key can decrypt the content key ciphertext. In this way, it can be ensured that the use license issued to the digital artwork display device 10 can only be decrypted by the digital artwork display device 10 so as to obtain the content key, and even if other device acquires the use license through improper ways, the other device cannot decrypt the use license, so the content key cannot be obtained. Therefore, the digital artwork management method can achieve high security where one device corresponds to one key. Step S102 can be performed by the file decryption unit 130 of the digital artwork display device 10 illustrated in FIG. 1 or FIG. 3, and the related description can be referred to the foregoing content, which is not repeated here.

Figure 5:
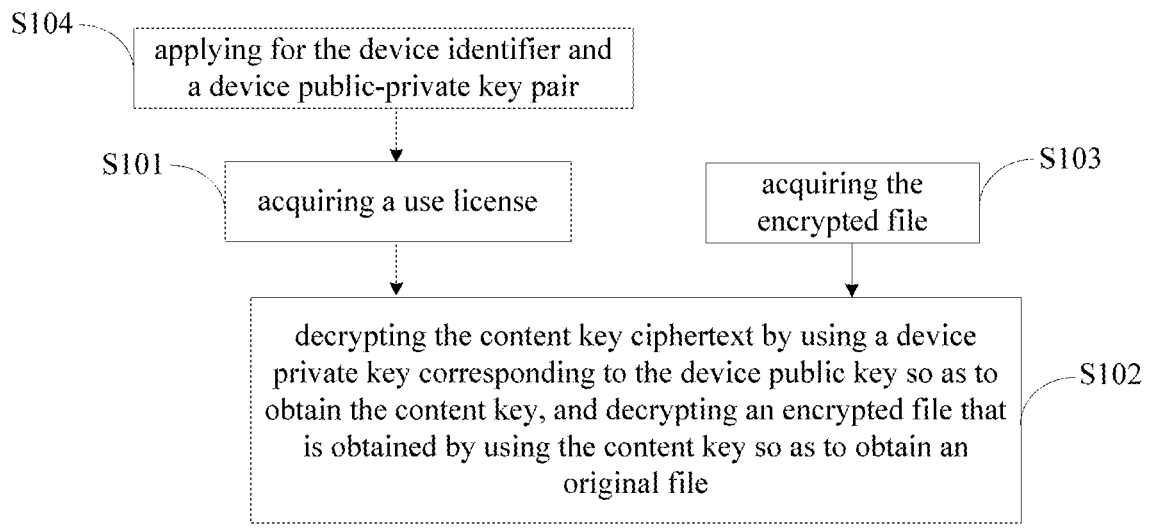
FIG. 5 is a schematic flowchart of another digital artwork management method provided by some embodiments of the present disclosure.

FIG. 5 is a schematic flowchart of another digital artwork management method provided by some embodiments of the present disclosure. As illustrated in FIG. 5, the digital artwork management method further includes steps S103 and S104, and the remaining steps are basically the same as the digital artwork management method illustrated in FIG. 4.

Step S103: acquiring the encrypted file.

Step S104: applying for the device identifier and a device public-private key pair.

For example, in step S103, the encrypted file is stored in another server (for example, a storage server, a public cloud, or the like), and the encrypted file can be acquired through a communication network and based on a corresponding communication protocol. The encrypted file is, for example, obtained by encrypting the original file by using the content key. Because the encrypted file is encrypted, the leakage of the original file can be avoided. Step S103 can be performed by the file acquisition unit 140 of the digital artwork display device 10 illustrated in FIG. 2, and the related description can be referred to the foregoing content, which is not repeated here.

For example, in step S104, the device public-private key pair includes a device public key and a device private key that is corresponding to the device public key, and the device public key and the device private key can be used to encrypt or decrypt digital content (for example, the obtained encrypted file). The device public-private key pair is in one-to-one correspondence with the digital artwork display device 10, and different devices correspond to different device public-private key pairs. For example, after applying and obtaining the device identifier and the device public-private key pair, the device identifier and the device private key can be stored in the digital artwork display device 10 (such as the storage device of the digital artwork display device 10) to facilitate subsequent decryption of the content key ciphertext. Step S104 can be performed by, for example, the registration unit 110 of the digital artwork display device 10 illustrated in FIG. 1 or FIG. 3, and the related description can be referred to the foregoing content, which is not repeated here.

It should be noted that, in some embodiments of the present disclosure, the execution order of step S103, step S104, and step S101 is not limited. Although FIG. 5 illustrates the above steps in a specific order, it does not limit the embodiments of the present disclosure. For example, the above steps can be performed in the order of S104-S101-S103-S102, or in the order of S103-S104-S101-S102, or in the order of S104-S103-S101-S102, or in other order, which is not limited in the embodiments of the present disclosure. The digital artwork management method may further include more steps to achieve more functions, which is not limited by the embodiments of the present disclosure.

At least one embodiment of the present disclosure further provides an electronic device, and the electronic device includes a license generation unit. The license generation unit is configured to generate a use license and send the use license to a requesting device. The use license includes a device identifier of the requesting device, a content identifier of an encrypted file, and a first content key ciphertext obtained by encrypting a content key by using a device public key, and the content key corresponds to the encrypted file. The electronic device can achieve high security where one device corresponds to one key, thereby preventing unauthorized devices from acquiring digital files (for example, digital artwork files). In addition, some embodiments of the present disclosure also solve the problem of high coupling degree between transaction services and license services in the traditional digital copyright management system, thereby improving the maintainability of the system, and implementing the efficient distribution of digital files (for example, digital artwork files).

Figure 6:
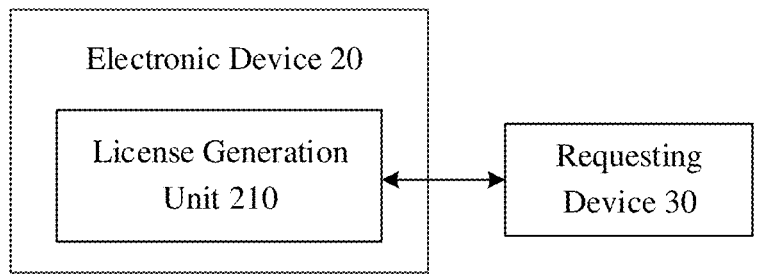
FIG. 6 is a schematic block diagram of an electronic device provided by some embodiments of the present disclosure.

FIG. 6 is a schematic block diagram of an electronic device provided by some embodiments of the present disclosure. As illustrated in FIG. 6, an electronic device 20 includes a license generation unit 210. As needed, the electronic device 20 may further includes a computing device (for example, a central processing unit), a storage device, a communication device (for example, a wireless communication device or a wired communication device), a modem, a radio frequency device, an encoding and decoding device, an input device (for example, a keyboard, a button, a mouse, or a touch screen), etc., and the embodiments of the present disclosure are not limited in this aspect. The electronic device 20 is, for example, applied to the scenario illustrated in FIG. 2, and the electronic device 20 is, for example, the first server 02, and can respond to the request of the painted screen 01 and provide corresponding services. Hereinafter, each unit in the electronic device 20 is described in detail with reference to the application scenario illustrated in FIG. 2.

The license generation unit 210 is configured to generate the use license and send the use license to the requesting device 30. For example, the use license includes the device identifier of the requesting device 30, the content identifier of the encrypted file, and the first content key ciphertext obtained by encrypting the content key by using the device public key. For example, the content key corresponds to the encrypted file, and can be used when the requesting device 30 decrypts the encrypted file. For example, in some examples, different encrypted files correspond to different content keys. In response to the request of the requesting device 30, the license generation unit 210 encrypts the content key by using the device public key corresponding to the requesting device 30, thereby generating the use license and sending the use license to the requesting device 30. For example, the license generation unit 210 and the requesting device 30 are communicated with each other through the communication network and based on the corresponding communication protocol, so as to transmit data. For example, the requesting device 30 may be the aforementioned digital artwork display device 10.

In the case where the electronic device 20 is the first server 02 illustrated in FIG. 2, the license generation unit 210 of the electronic device 20 is implemented as, for example, the license service unit 022 of the first server 02. In this case, the requesting device 30 is, for example, the painted screen 01. The license service unit 022 responds to the request of the painted screen 01, encrypts the content key by using the device public key corresponding to the painted screen 01 so as to generate the first content key ciphertext, thereby generating the use license, and sending the use license to the painted screen 01. The use license includes the device identifier of the painted screen 01, the content identifier of the encrypted file, and the first content key ciphertext. The painted screen 01 can subsequently decrypt the first content key ciphertext by using the device private key stored in the painted screen 01 so as to obtain the content key, and decrypt the encrypted file by using the content key so as to obtain the original file. The original file is, for example, a digital painting purchased by the painted screen 01. Because the first content key ciphertext can only be decrypted by using the device private key corresponding to the painted screen 01, even if other devices acquire the use license through improper ways, the other devices cannot decrypt the first content key ciphertext because of absence of the corresponding device private key. Therefore, the electronic device 20 can achieve high security where one device corresponds to one key, thereby preventing unauthorized devices from acquiring digital artwork files (for example, digital paintings).

Figure 7:
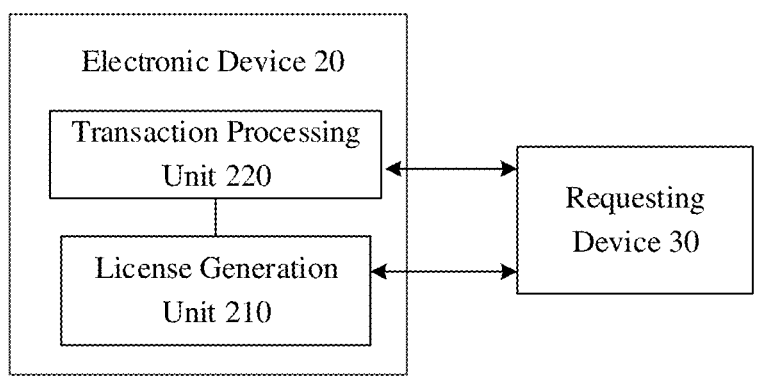
FIG. 7 is a schematic block diagram of another electronic device provided by some embodiments of the present disclosure.

FIG. 7 is a schematic block diagram of another electronic device provided by some embodiments of the present disclosure. As illustrated in FIG. 7, the electronic device 20 is basically the same as the electronic device 20 illustrated in FIG. 6 except that a transaction processing unit 220 is further included.

The transaction processing unit 220 is configured to receive a transaction request of the requesting device 30, generate a transaction credential according to the transaction request, and send the transaction credential to the requesting device 30. For example, the transaction request may be a payment operation initiated by the requesting device 30, and the transaction request includes the device identifier of the requesting device 30. The transaction credential includes the device identifier of the requesting device 30 and may also include the content identifier of the encrypted file and a transaction credential digital signature. The transaction credential digital signature is generated by using a transaction credential private key. The transaction processing unit 220 sends the transaction credential to the requesting device 30 after generating the transaction credential.

In the case where the electronic device 20 is the first server 02 illustrated in FIG. 2, the transaction processing unit 220 of the electronic device 20 is implemented as, for example, the transaction management unit 023 of the first server 02. In this case, the requesting device 30 is, for example, the painted screen 01. The painted screen 01 can pay a fee to the transaction management unit 023 in the first server 02 and request the transaction credential. The transaction management unit 023 generates the transaction credential after receiving the fee paid by painted screen 01 and sends the transaction credential to the painted screen 01. The transaction credential includes, for example, the device identifier of the painted screen 01, the content identifier of the purchased digital painting, the uses-permission, and a transaction credential digital signature. The transaction credential digital signature is generated, for example, by using a transaction credential private key stored in the transaction management unit 023.

For example, in an example, the license generation unit 210 is further configured to receive the transaction credential from the requesting device 30 and verify the transaction credential digital signature by using a transaction credential public key corresponding to the transaction credential private key. After the transaction processing unit 220 sends the transaction credential to the requesting device 30, the requesting device 30 sends the transaction credential to the license generation unit 210 to request the use license. After receiving the transaction credential, the license generation unit 210 verifies the integrity of the transaction credential digital signature by using the transaction credential public key stored in the license generation unit 210. After the verification is passed, the license generation unit 210 generates the use license and sends the use license to the requesting device 30. This method can prevent illegal users from forging and tampering with the content of the transaction credential.

In the case where the electronic device 20 is the first server 02 illustrated in FIG. 2, the transaction processing unit 220 of the electronic device 20 is, for example, implemented as the transaction management unit 023 of the first server 02, the license generation unit 210 of the electronic device 20 is, for example, implemented as the license service unit 022 of the first server 02, and the requesting device 30 is, for example, the painted screen 01. After the painted screen 01 pays a fee to the transaction management unit 023 and obtains the transaction credential, the painted screen 01 sends the transaction credential to the license service unit 022. The license service unit 022 verifies the transaction credential digital signature by using the transaction credential public key, and then generates the use license and sends the use license to the painted screen 01.

Figures 8, 9:
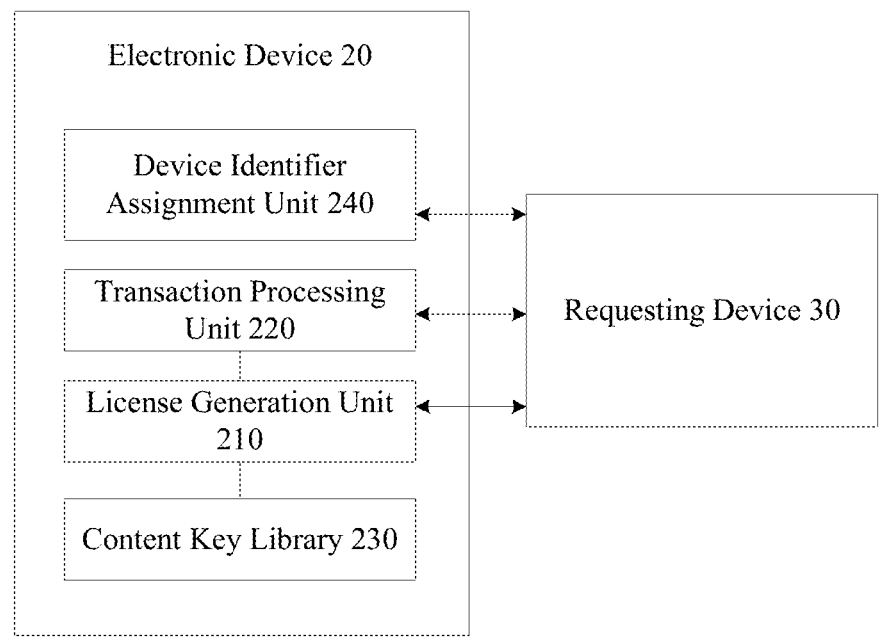
FIG. 8 is a schematic block diagram of still another electronic device provided by some embodiments of the present disclosure.
FIG. 9 is a schematic flowchart of a digital artwork management method provided by some embodiments of the present disclosure.

FIG. 8 is a schematic block diagram of another electronic device provided by some embodiments of the present disclosure. As illustrated in FIG. 8, the electronic device 20 is basically the same as the electronic device 20 illustrated in FIG. 7 except that the electronic device 20 further includes a content key library 230 and a device identifier assignment unit 240.

The content key library 230 is used to store the content key corresponding to the encrypted file, and the content key is stored in the content key library 230 in an encrypted manner. That is, a second content key ciphertext is stored in the content key library 230, and the second content key ciphertext is obtained by encrypting the content key by using a service public key. By storing the content key in an encrypted manner, the security can be improved, and leakage of the content key can be avoided. For example, the content key library 230 may adopt an appropriate database form, such as a relational database or a non-relational database. For example, the content key library 230 can run on the same computer or server as other units in the electronic device 20, or separately run on a database server in a local area network, or run on a database server (such as a cloud server) in the internet. The embodiments of the present disclosure are not limited in this aspect.

The license generation unit 210 is further configured to acquire the second content key ciphertext obtained by encrypting the content key by using the service public key from the content key library 230, and decrypt the second content key ciphertext by using a service private key corresponding to the service public key so as to obtain the content key, and then encrypt the content key by using the device public key so as to obtain the first content key ciphertext, and then obtain the use license. For example, after receiving the transaction credential sent by the requesting device 30, the license generation unit 210 acquires the corresponding second content key ciphertext from the content key library 230 according to the content identifier corresponding to the encrypted file in the transaction credential, and the second content key ciphertext corresponds to the encrypted file. For example, the service private key is stored in the license generation unit 210, so the license generation unit 210 can decrypt the second content key ciphertext by using the service private key. Then, according to the device identifier of the requesting device 30 contained in the transaction credential, the content key is encrypted by using the device public key corresponding to the requesting device 30 so as to obtain the first content key ciphertext, thereby generating the use license and sending the use license to the requesting device 30. After obtaining the use license, the requesting device 30 decrypts the first content key ciphertext by using the device private key stored in the requesting device 30 so as to obtain the content key, and then decrypts the encrypted file that is obtained by using the content key so as to obtain the original file.

In the case where the electronic device 20 is the first server 02 illustrated in FIG. 2, the content key library 230 of the electronic device 20 is, for example, implemented as the content key database 024 of the first server 02. The license service unit 022 of the first server 02 acquires the corresponding second content key ciphertext from the content key database 024 according to the content identifier corresponding to the encrypted file, and decrypts the second content key ciphertext by using the service private key so as to obtain the corresponding content key, and then encrypt the content key by using the device public key corresponding to the painted screen 01 according to the device identifier of the painted screen 01 so as to obtain the first content key ciphertext, thereby generating the use license and sending the use license to the painted screen 01.

It should be noted that in some embodiments of the present disclosure, the key pair of the service public key and the service private key may be the same as the key pair of the license public key and the license private key, so as to lower the complexity of system processing. Of course, the embodiments of the present disclosure are not limited in this aspect, and the above two key pairs may also be different key pairs to improve the flexibility and security of system processing.

As illustrated in FIG. 8, the device identifier assignment unit 240 is configured to receive an application of the requesting device 30 and assign the device identifier and a device public-private key pair that are corresponding to the requesting device 30. For example, the requesting device 30 sends a request to the device identifier assignment unit 240 when performing a registration. The device identifier assignment unit 240 receives the request and assigns the device identifier and the device public-private key pair that are corresponding to the requesting device 30. The device identifier and the device public-private key pair of each requesting device 30 are unique, that is, the device identifiers of different requesting devices 30 are different, and the device public-private key pairs of different requesting devices 30 are also different. In this way, it can be ensured that the original files (for example, the digital paintings) purchased by the requesting device 30 can only be used on this requesting device 30, thereby achieving high security where one device corresponds to one key. For example, the device identifier assignment unit 240 sends the assigned device identifier and the device private key of the device public-private key pair to the requesting device 30, and the device identifier and the device private key are stored in the requesting device 30. For example, the device identifier assignment unit 240 stores the assigned device public key of the device public-private key pair in the electronic device 20, so that the license generation unit 210 can use the device public key when generating the use license.

In the case where the electronic device 20 is the first server 02 illustrated in FIG. 2, the device identifier assignment unit 240 of the electronic device 20 is implemented as, for example, the DRM unit 021 of the first server 02. The DRM unit 021 responds to the application of the painted screen 01 and assigns the device identifier and the device public-private key pair to the painted screen 01, and transmits the assigned device identifier and the device private key of the device public-private key pair to the painted screen 01, so that the device identifier and the device private key can be stored in the painted screen 01. The DRM unit 021 stores the device public key of the assigned device public-private key pair in the first server 02 (for example, stored in the license service unit 022 of the first server 02), so that the license service unit 022 can use the device public key when generating the use license.

It should be noted that in some embodiments of the present disclosure, the electronic device 20 may be a server cluster, a separate server, or a virtual server, and accordingly, the units in the electronic device 20 may be different servers, or different service processes running on the same server. Each unit may be implemented as hardware, firmware, or software modules, and these software modules may be run on the same hardware or firmware to provide different application programs or service processes, which are not limited in the embodiments of the present disclosure.

At least one embodiment of the present disclosure further provides a digital artwork management method, which can achieve high security where one device corresponds to one key, and can prevent unauthorized devices from acquiring digital files (for example, digital artwork files). In addition, some embodiments of the present disclosure also solve the problem of high coupling degree between transaction services and license services in the traditional digital copyright management system, thereby improving the maintainability of the system, and implementing the efficient distribution of digital files (for example, digital artwork files).

FIG. 9 is a schematic flowchart of a digital artwork management method provided by some embodiments of the present disclosure. For example, the digital artwork management method can be used for the electronic device 20 illustrated in FIG. 6, FIG. 7, or FIG. 8. As illustrated in FIG. 9, the digital artwork management method includes following steps.

Step S201: generating a use license and sending the use license to a requesting device.

For example, in step S201, the use license includes the device identifier of the requesting device 30, the content identifier of the encrypted file, and the first content key ciphertext obtained by encrypting the content key by using the device public key. For example, the content key corresponds to the encrypted file, and can be used when the requesting device 30 decrypts the encrypted file. Step S201 can be performed by, for example, the license generation unit 210 of the electronic device 20 illustrated in FIG. 6, FIG. 7, or FIG. 8, and the related description can be referred to the foregoing content, which is not repeated here.

Figure 10:
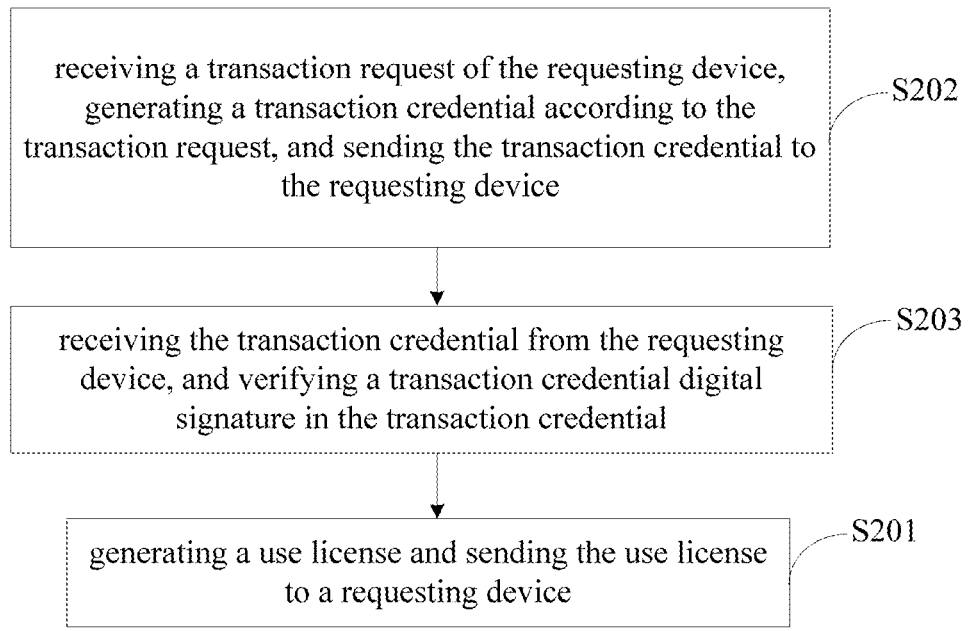
FIG. 10 is a schematic flowchart of another digital artwork management method provided by some embodiments of the present disclosure.

FIG. 10 is a schematic flowchart of another digital artwork management method provided by some embodiments of the present disclosure. As illustrated in FIG. 10, the digital artwork management method further includes steps S202 and S203, and the remaining steps are basically the same as the digital artwork management method illustrated in FIG. 9.

Step S202: receiving a transaction request of the requesting device, generating a transaction credential according to the transaction request, and sending the transaction credential to the requesting device.

Step S203: receiving the transaction credential from the requesting device, and verifying a transaction credential digital signature in the transaction credential.

For example, in step S202, the transaction request may be a payment operation initiated by the requesting device 30, and the transaction request includes the device identifier of the requesting device 30. The transaction credential includes the device identifier of the requesting device 30, and may also include the content identifier of the encrypted file and a transaction credential digital signature. The transaction credential digital signature is generated by using the transaction credential private key. Step S202 may be performed by, for example, the transaction processing unit 220 of the electronic device 20 illustrated in FIG. 7 or FIG. 8, and the related description can be referred to the foregoing content, which is not repeated here.

For example, in step S203, after receiving the transaction credential sent by the requesting device 30, the transaction credential digital signature is verified by using the transaction credential public key corresponding to the transaction credential private key. After the verification is passed, the use license is generated, and the use license is sent to the requesting device 30. This method can prevent illegal users from forging and tampering with the content of the transaction credential. Step S203 may be performed by, for example, the license generation unit 210 of the electronic device 20 illustrated in FIG. 6, FIG. 7, or FIG. 8, and the related description can be referred to the foregoing content, which is not repeated here.

For example, step S201 illustrated in FIG. 10 can further include following steps.

Step S2011: acquiring a second content key ciphertext obtained by encrypting the content key by using a service public key, and decrypting the second content key ciphertext by using a service private key corresponding to the service public key so as to obtain the content key.

Step S2012: encrypting the content key by using the device public key so as to obtain the first content key ciphertext, thereby obtaining the use license.

For example, in step S2011, after receiving the transaction credential sent by the requesting device 30, the corresponding second content key ciphertext is acquired according to the content identifier corresponding to the encrypted file in the transaction credential. For example, the second content key ciphertext corresponds to the encrypted file, and the second content key ciphertext is obtained by encrypting the content key by using the service public key, and the content key can be used to decrypt the encrypted file so as to obtain the original file. Then, the service private key is used to decrypt the second content key ciphertext so as to obtain the content key.

For example, in step S2012, the content key is encrypted by using the device public key corresponding to the requesting device 30 according to the device identifier of the requesting device 30 contained in the transaction credential, so as to obtain the first content key ciphertext, thereby generating the use license and sending the use license to the requesting device 30. After obtaining the use license, the requesting device 30 decrypts the first content key ciphertext by using the device private key stored in the requesting device 30 to obtain the content key, and then decrypts the obtained encrypted file by using the content key to obtain the original file.

Steps S2011 and S2012 can be performed by, for example, the license generation unit 210 of the electronic device 20 illustrated in FIG. 6, FIG. 7, or FIG. 8, and the related description can be referred to the foregoing content, which is not repeated here. The digital artwork management method may further include more steps to achieve more functions, which are not limited in the embodiments of the present disclosure.

At least one embodiment of the present disclosure further provides an electronic device, which includes a processor and a memory. The memory includes one or more computer program modules that are stored in the memory and configured to be executed by the processor, and the one or more computer program modules include instructions for implementing the digital artwork management method according to any one of the embodiments of the present disclosure. The electronic device can achieve high security where one device corresponds to one key, thereby preventing unauthorized devices from acquiring digital files (for example, digital artwork files). In addition, some embodiments of the present disclosure also solve the problem of high coupling degree between transaction services and license services in the traditional digital copyright management system, thereby improving the maintainability of the system, and implementing the efficient distribution of digital files (for example, digital artwork files).

Figure 11:
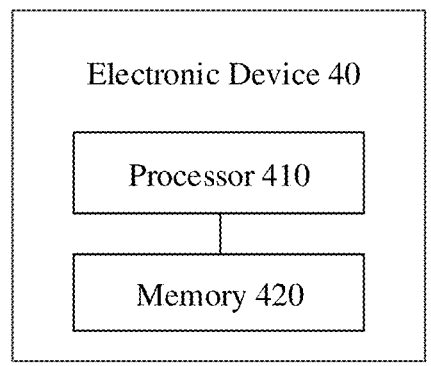
FIG. 11 is a schematic block diagram of an electronic device provided by some embodiments of the present disclosure.

FIG. 11 is a schematic block diagram of an electronic device provided by some embodiments of the present disclosure. As illustrated in FIG. 11, an electronic device 40 includes a processor 410 and a memory 420. The memory 420 is used to store non-temporary computer-readable instructions (for example, one or more computer program modules). The processor 410 is configured to execute the non-temporary computer-readable instructions. When executed by the processor 410, the non-temporary computer-readable instructions can perform one or more steps in the digital artwork management method described above. The memory 420 and the processor 410 can be interconnected by a bus system and/or other forms of connection mechanisms (not illustrated). For example, the electronic device 40 may also be the aforementioned digital artwork display device 10 or the electronic device 20.

For example, the memory 420 and the processor 410 may be provided on a user side, for example, can be provided in the painted screen 01 for performing one or more steps in the digital artwork management method described in FIG. 4 or FIG. 5. For example, the memory 420 and the processor 410 may also be provided on a server side (or cloud) for performing one or more steps in the digital artwork management method described in FIG. 9 or FIG. 10.

For example, the processor 410 may be a central processing unit (CPU), a digital signal processor (DSP), or other forms of processing units with data processing capabilities and/or program execution capabilities, such as a field programmable gate array (FPGA), etc. For example, the central processing unit (CPU) may adopt an X86 or ARM architecture. The processor 410 may be a general-purpose processor or a dedicated processor, and may control other components in the electronic device 40 to perform desired functions.

For example, the memory 420 may include any combination of one or more computer program products. The computer program products may include various forms of computer-readable storage media, e.g., volatile memory and/or nonvolatile memory. Volatile memory, for example, may include a random access memory (RAM) and/or a cache memory. Nonvolatile memory, for example, may include a read-only memory (ROM), a hard disk, an erasable programmable read-only memory (EPROM), a portable compact disk read-only memory (CD-ROM), a USB memory, a flash memory, and the like. One or more computer program modules can be stored in the computer-readable storage medium, and the processor 410 can execute the one or more computer program modules to implement various functions of the electronic device 40. Various application programs and various data, various data used and/or generated by the application programs, and the like, can also be stored in the computer-readable storage medium. For the specific functions and technical effects of the electronic device 40, reference can be made to the description about the digital artwork management methods above, which is not repeated here.

At least one embodiment of the present disclosure further provides an electronic device, which includes an application unit, an encryption unit, and a transmission unit. The application unit is configured to apply for a content identifier for an original file. The encryption unit is configured to generate a content key, encrypt and encapsulate the original file by using the content key so as to obtain an encrypted file, and encrypt the content key so as to obtain a content key ciphertext. The encrypted file includes the content identifier and an original file ciphertext corresponding to the original file. The transmission unit is configured to transmit the encrypted file and the content key ciphertext to different servers for storage. The electronic device can be used to prevent unauthorized devices from acquiring digital files (for example, digital artwork files), and can realize the efficient distribution of digital files (for example, digital artwork files).

Figure 12:
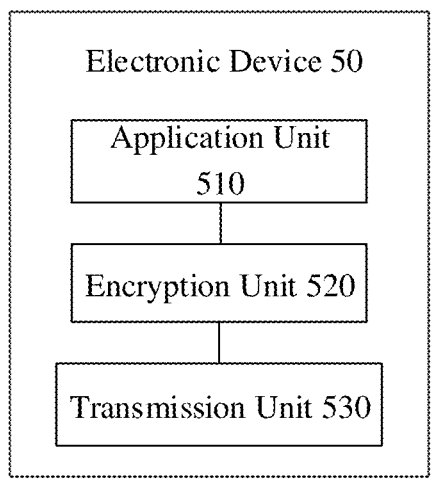
FIG. 12 is a schematic block diagram of another electronic device provided by some embodiments of the present disclosure.

FIG. 12 is a schematic block diagram of another electronic device provided by some embodiments of the present disclosure. As illustrated in FIG. 12, an electronic device 50 includes an application unit 510, an encryption unit 520, and a transmission unit 530. As needed, the electronic device 50 may further include a computing device (for example, a central processing unit), a storage device, a communication device (for example, a wireless communication device or a wired communication device), a modem, a radio frequency device, an encoding and decoding device, a display device (for example, a liquid crystal display panel, an organic light-emitting diode display panel, a projection device, or the like), an input device (for example, a keyboard, a button, a mouse, a touch screen, or the like), a data transmission interface (for example, an HDMI interface, a USB interface, etc., so that other output devices and storage devices can be connected), a speaker, etc., and the embodiments of the present disclosure are not limited in this aspect. The electronic device 50 is, for example, applied to the scenario illustrated in FIG. 2, and the electronic device 50 is, for example, a mobile phone 04 and can upload digital paintings for sale. Hereinafter, each unit in the electronic device 50 is described in detail in conjunction with the application scenario illustrated in FIG. 2.

The application unit 510 is configured to apply for the content identifier for the original file. For example, the original file may be a digital artwork file, such as a digital painting, a video, an audio, an e-book, etc., which is not limited in the embodiments of the present disclosure. The content identifier is in one-to-one correspondence with the original file, and different original files correspond to different content identifiers, so that the original file can be identified and determined by the content identifier. For example, the content identifier can be incorporated into the data related to the original file, so as to identify, verify, and determine the original file in transactions, permits, and other affairs. These related data can be, for example, transaction credentials and use licenses. The content identifier is also in one-to-one correspondence with the content key, so the content identifier can be stored in association with the content key ciphertext when storing the content key ciphertext. In the case where the electronic device 50 is the mobile phone 04 illustrated in FIG. 2, the mobile phone 04 can apply to the DRM unit 021 in the first server 02 for the content identifier of the original file. The DRM unit 021 transmits the assigned content identifier to the mobile phone 04. For example, the content identifier can be a hash value obtained by performing a hash operation on the original file, the influencing factors for performing the hash operation may include the file size, file content, creation date, creator, etc., and the hash operation can be performed in the DRM unit 021. Of course, the embodiments of the present disclosure are not limited to this case, and in some other embodiments, the hash operation can also be performed in the electronic device 50 under the control of the DRM unit 021.

The encryption unit 520 is configured to generate the content key, encrypt and encapsulate the original file by using the content key so as to obtain the encrypted file, and encrypt the content key so as to obtain the content key ciphertext. For example, the encryption unit 520 adopts an encryption algorithm to generate a random content key, and the encryption algorithm may adopt AES128, AES256, or other applicable cryptographic algorithms. The encryption unit 520 encrypts and encapsulates the original file by using the content key so as to obtain the encrypted file. The encrypted file includes, for example, the content identifier and the original file ciphertext corresponding to the original file, and may further include information such as the name of the painting, author, description of the painting, encryption algorithm, version of the encrypted file, and the like. The encryption unit 520 encrypts the content key by using the service public key so as to obtain the content key ciphertext, thereby improving the security of transmission of the content key. For example, the content key ciphertext can be the aforementioned second content key ciphertext.

The transmission unit 530 is configured to transmit the encrypted file and the content key ciphertext to different servers for storage. For example, the encrypted file and the content key ciphertext are transmitted to different servers to be stored separately, so that the encrypted file and the content key ciphertext can be prevented from being leaked simultaneously, and the storage security can be improved. For example, the encrypted file is transmitted to a public cloud for storage, so that any device can quickly acquire the encrypted file so as to achieve efficient distribution of the encrypted file; and the content key ciphertext is transmitted to, for example, a private cloud and stored in the content key library. Because the encrypted file is encrypted, the original file cannot be leaked when stored in the public cloud. In the case where the electronic device 50 is the mobile phone 04 illustrated in FIG. 2, the transmission unit 530 in the mobile phone 04 transmits the encrypted file to the second server 03 for storage, and transmits the content key ciphertext to the first server 02 and the content key ciphertext is stored in the content key database 024.

The electronic device 50 can complete the encrypted upload of the original file (for example, a digital painting) by the joint action of the application unit 510, the encryption unit 520, and the transmission unit 530. For example, the process of the encrypted upload is completed by the copyright owner of the original file through the electronic device 50.

It should be noted that the electronic device 50 is not limited to include the units described above and can further include more units to achieve more comprehensive functions. Each unit can be implemented as hardware, firmware, or software modules, and these software modules can be run in the electronic device 50 to provide corresponding application programs or service processes, which are not limited in the embodiments of the present disclosure. The electronic device 50 is not limited to the mobile phone 04, and can also be other devices, such as a tablet computer, a personal computer, a notebook computer, etc., which are not limited in the embodiments of the present disclosure.

Figure 13:
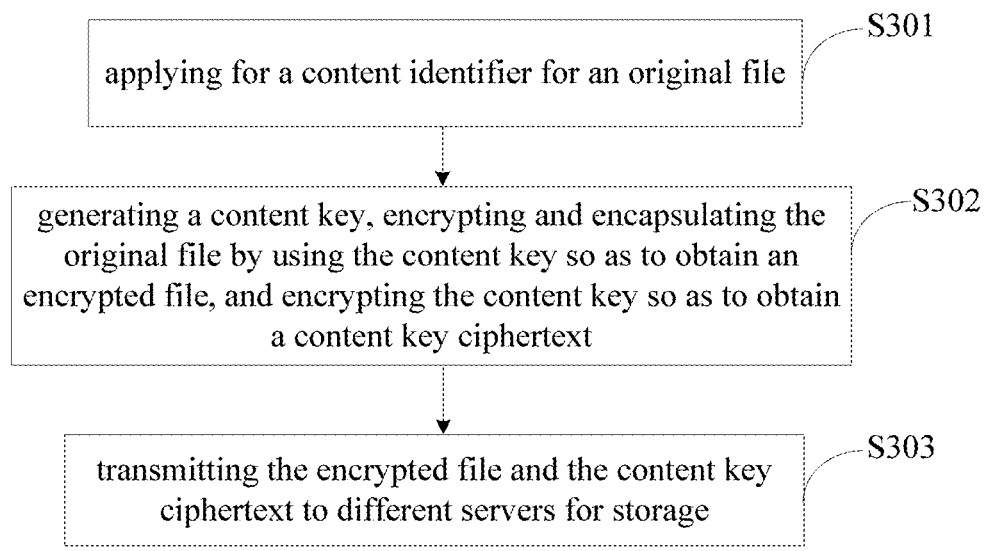
FIG. 13 is a schematic flowchart of a digital artwork management method provided by some embodiments of the present disclosure.

FIG. 13 is a schematic flowchart of a digital artwork management method provided by some embodiments of the present disclosure. The digital artwork management method can be used for the electronic device 50 illustrated in FIG. 12. As illustrated in FIG. 13, the digital artwork management method includes following steps.

Step S301: applying for a content identifier for an original file.

Step S302: generating a content key, encrypting and encapsulating the original file by using the content key so as to obtain an encrypted file, and encrypting the content key so as to obtain a content key ciphertext, where the encrypted file includes the content identifier and an original file ciphertext corresponding to the original file.

Step S303: transmitting the encrypted file and the content key ciphertext to different servers for storage.

For example, the above steps can be performed by the electronic device 50 illustrated in FIG. 12. For example, step S301 can be performed by the application unit 510, step S302 can be performed by the encryption unit 520, and step S303 can be performed by the transmission unit 530. Relevant descriptions can be referred to the foregoing contents, and are not repeated here.

Figure 14:
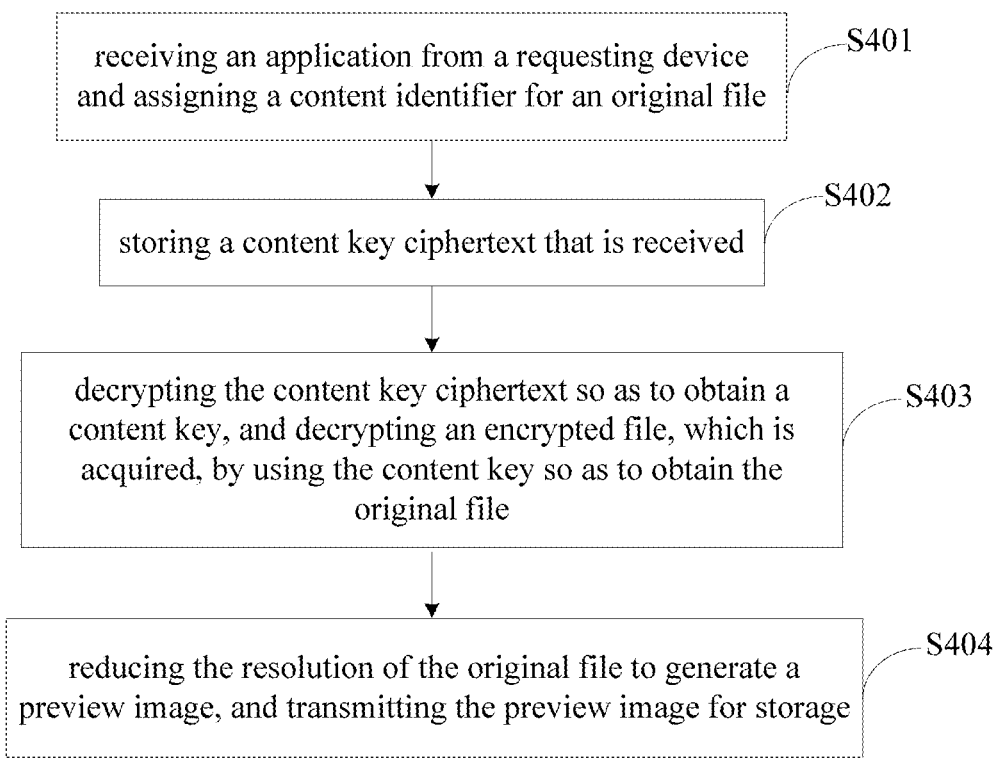
FIG. 14 is a schematic flowchart of another digital artwork management method provided by some embodiments of the present disclosure.

FIG. 14 is a schematic flowchart of another digital artwork management method provided by some embodiments of the present disclosure. The digital artwork management method can be used for the first server 02 illustrated in FIG. 2. As illustrated in FIG. 14, the digital artwork management method includes following steps.

Step S401: receiving an application from a requesting device and assigning a content identifier for an original file.

Step S402: storing a content key ciphertext that is received.

Step S403: decrypting the content key ciphertext so as to obtain a content key, and decrypting an encrypted file, which is acquired, by using the content key so as to obtain the original file.

Step S404: reducing the resolution of the original file to generate a preview image, and transmitting the preview image for storage.

For example, in step S401, the DRM unit 021 in the first server 02 receives an application from a requesting device (for example, the mobile phone 04) and assigns the content identifier for the original file. The content identifier is in one-to-one correspondence with the original file. The DRM unit 021 transmits the assigned content identifier to the mobile phone 04.

For example, in step S402, after receiving the content key ciphertext, the DRM unit 021 stores the content key ciphertext in the content key database 024.

For example, in step S403, the DRM unit 021 decrypts the content key ciphertext by using the service private key stored in the DRM unit 021, so as to obtain the content key. The DRM unit 021 acquires the corresponding encrypted file from the second server 03 according to the content identifier, and decrypts the encrypted file by using the content key, so as to obtain the original file.

For example, in step S404, the original file is, for example, a digital painting, and the DRM unit 021 reduces the resolution of the digital painting to generate a preview image, and transmits the preview image to the second server 03 for storage, thereby facilitating the user who needs to purchase the digital painting to browse through the painted screen 01. For example, a non-erasable visible watermark can also be embedded in the preview image. Because the preview image has a lower resolution and contains the non-erasable visible watermark, the use value is greatly reduced. Although the user can acquire the preview image from the second server 03, the leakage of the original file can be avoided.

At least one embodiment of the present disclosure further provides a digital file management system, and the system can achieve high security where one device corresponds to one key, thereby preventing unauthorized devices from acquiring digital files (for example, digital artwork files). In addition, some embodiments of the present disclosure also solve the problem of high coupling degree between transaction services and license services in the traditional digital copyright management system, thereby improving the maintainability of the system, and implementing the efficient distribution of digital files (for example, digital artwork files).

For example, in some embodiments, the digital file management system includes the digital artwork display device 10 illustrated in FIG. 3 and the electronic device 20 illustrated in FIG. 8, and in some embodiments, the digital file management system can further include the electronic device 50 illustrated in FIG. 12. For example, the system service provider of the digital file management system can provide a corresponding software for digital painting copyright owners and digital painting copyright purchasers to download, install, and use, and provide a corresponding service platform (server) for digital painting copyright owners and digital painting copyright purchasers to connect and use. In this way, the digital painting copyright owners can download, install, and use the software according to the instructions of the system service provider, or directly run the corresponding executable codes in a browser, so as to realize the electronic device 50. The digital painting copyright purchasers can implement the digital artwork display device 10 through a dedicated digital artwork display device (for example, a painted screen), or can download, install, and use the software in a general electronic device (for example, a tablet computer) according to the instructions of the system service provider, or directly run the corresponding executable codes in a browser so as to realize the digital artwork display device 10. For the technical effects and detailed description of the digital file management system, reference can be made to the descriptions of the digital artwork display device and the electronic device in the foregoing, which are not repeated here.

For example, the digital file management system is applied in the scenario illustrated in FIG. 2, the digital artwork display device 10 can be implemented as the painted screen 01, the electronic device 20 can be implemented as the first server 02, and the electronic device 50 can be implemented as the mobile phone 04. The operation flow of the digital file management system is described below in conjunction with the application scenario illustrated in FIG. 2.

First, a digital painting is encrypted and uploaded. The mobile phone 04 acquires the digital painting, connects to the internet, for example, logs in to a digital painting transaction platform, and applies to the DRM unit 021 of the first server 02 for a content identifier for the original file (for example, the digital painting). The mobile phone 04 generates a content key, encrypts and encapsulates the digital painting by using the content key so as to obtain an encrypted file, and encrypts the content key by using a service public key so as to obtain a content key ciphertext (for example, the aforementioned second content key ciphertext). The encrypted file includes the content identifier and an original file ciphertext corresponding to the digital painting. The mobile phone 04 transmits the encrypted file to the second server 03 (for example, a public cloud) for storage, and for example, the content identifier can be transmitted to the second server 03 for storage together with the encrypted file, so as to be used to retrieve and locate the encrypted file. In addition, the mobile phone 04 transmits the content key ciphertext to the first server 02 for storage, and for example, the content identifier can be transmitted to the first server 02 together with the content key ciphertext for storage, so as to be used to retrieve and locate the content key ciphertext.

Second, the management of the digital painting is performed. After receiving the content key ciphertext and the content identifier sent by the mobile phone 04, the DRM unit 021 stores the content key ciphertext in the content key database 024. The DRM unit 021 decrypts the content key ciphertext by using a service private key so as to obtain the content key. The DRM unit 021 acquires the encrypted file from the second server 03 according to the content identifier and uses the content key to decrypt the encrypted file, thereby obtaining the digital painting. The DRM unit 021 reduces the resolution of the digital painting and embeds a visible watermark, so as to generate a preview image, and then transmits the preview image to the second server 03 for storage. The second server 03 can display the preview image to the public through, for example, a webpage, etc., so that the public can browse the preview image and choose whether to purchase or not.

In addition, the registration of the painted screen 01 is performed. The painted screen 01 connects to the internet and applies to the DRM unit 021 for a device identifier and a device public-private key pair. After receiving an application of the painted screen 01, the DRM unit 021 assigns the device identifier and the device public-private key pair for the painted screen 01, and transmits the device identifier and the device private key of the device public-private key pair to the painted screen 01, whereby these data are stored in the painted screen 01 for later use. The device public key of the device public-private key pair is stored in the first server 02 (for example, the license service unit 022 of the first server 02).

Then, the purchase and acquisition of the digital painting are performed. For example, the user browses the preview image of the digital painting stored in the second server 03 through the painted screen 01, selects the digital painting to be purchased, and initiates a transaction request to the transaction management unit 023 of the first server 02, and then performs a payment operation. The corresponding encrypted file can be acquired from the second server 03 by using the content identifier after the payment operation is completed, and for example, the transaction request includes the content identifier of the digital painting to be purchased and the device identifier of the painted screen 01. After receiving the fee paid by the painted screen 01, the transaction management unit 023 generates a transaction credential and sends the transaction credential to the painted screen 01. The transaction credential includes the device identifier of the painted screen 01, and further includes the content identifier corresponding to the purchased digital painting, the uses-permission, and a transaction credential digital signature. The transaction credential digital signature is generated by using a transaction credential private key. The painted screen 01 can confirm the received transaction credential through the device identifier and the content identifier, and then send the received transaction credential to the license service unit 022 of the first server 02 to request a use license. After verifying the transaction credential digital signature by using a transaction credential public key, the license service unit 022 acquires the corresponding content key ciphertext (for example, the aforementioned second content key ciphertext) from the content key database 024 according to the content identifier, decrypts the content key ciphertext by using the service private key so as to obtain the content key, and then encrypts the content key by using the device public key corresponding to the painted screen 01 to obtain a new content key ciphertext (for example, the aforementioned first content key ciphertext), so as to generate the use license. The use license includes the device identifier of the painted screen 01, the content identifier corresponding to the purchased digital painting, the uses-permission, the new content key ciphertext, and a license digital signature. The license digital signature is generated by using a license private key.

Finally, the purchased digital painting is displayed. After receiving the use license, the painted screen 01 verifies the license digital signature by using a license public key, and can confirm the received use license through the device identifier and the content identifier, and then decrypts the content key ciphertext in the use license by using the device private key, so as to obtain the content key. The painted screen 01 decrypts the obtained encrypted file by using the content key, thereby obtaining the digital painting. Therefore, the painted screen 01 completes the purchase and acquisition of the digital painting, the digital painting can be used by the painted screen 01, for example, for display, etc. The usage follows certain terms included in the use license, such as deadline, method, authority, etc.

It should be noted that, in some embodiments of the present disclosure, the operation flow of the digital file management system is not limited to the above-described method, and can also be other applicable methods, which can include more or fewer operation steps, and can be determined according to the actual needs.

The following statements should be noted.

(1) The accompanying drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A digital artwork display device, comprising a registration circuit, a transaction circuit, and a file decryption circuit,
   wherein the registration circuit is configured to apply for a device identifier and a device public-private key pair, and the device public-private key pair comprises a device public key and a device private key that is corresponding to the device public key;
   the transaction circuit is configured to acquire a use license, and the use license comprises the device identifier and a content key ciphertext obtained by encrypting a content key by using the device public key; and
   the file decryption circuit is configured to decrypt the content key ciphertext in the use license by using the device private key so as to obtain the content key, and decrypt an encrypted file that is obtained by using the content key so as to obtain an original file;
   the device identifier is obtained by performing a hash operation with an international mobile equipment identity, a product serial number, or a media access control address, of the digital artwork display device.

2. The digital artwork display device according to claim 1, further comprising a file acquisition circuit, wherein the file acquisition circuit is configured to acquire the encrypted file.

3. The digital artwork display device according to claim 1, wherein the transaction circuit comprises a transaction credential acquisition circuit and a license acquisition circuit;
   the transaction credential acquisition circuit is configured to request and acquire a transaction credential, and the transaction credential comprises the device identifier; and
   the license acquisition circuit is configured to request and acquire the use license by using the transaction credential.

4. The digital artwork display device according to claim 3, wherein the transaction credential acquisition circuit is further configured to perform a payment operation.

5. The digital artwork display device according to claim 3, wherein the transaction credential further comprises a content identifier of the encrypted file and a transaction credential digital signature.

6. The digital artwork display device according to claim 3, wherein the use license further comprises a content identifier of the encrypted file and a license digital signature.

7. The digital artwork display device according to claim 6, wherein the license digital signature is generated by using a license private key, and
   the license acquisition circuit is further configured to verify the license digital signature by using a license public key corresponding to the license private key.

8. The digital artwork display device according to claim 1, further comprising an output circuit, wherein the output circuit is configured to output the original file.

9. A digital artwork management method for a digital artwork display device, wherein the digital artwork display device is assigned a device identifier, and the digital artwork management method comprises:
   acquiring a use license, wherein the use license comprises the device identifier and a content key ciphertext obtained by encrypting a content key by using a device public key; and
   decrypting the content key ciphertext by using a device private key corresponding to the device public key so as to obtain the content key, and decrypting an encrypted file that is obtained by using the content key so as to obtain an original file,
   wherein the device identifier is obtained by performing a hash operation with an international mobile equipment identity, a product serial number, or a media access control address, of the digital artwork display device.

10. The digital artwork management method according to claim 9, further comprising: acquiring the encrypted file.

11. The digital artwork management method according to claim 9, further comprising:
    applying for the device identifier and a device public-private key pair,
    wherein the device public-private key pair comprises the device public key and the device private key.

12. The digital artwork management method according to claim 9, wherein acquiring the use license comprises:
    requesting and acquiring a transaction credential, wherein the transaction credential comprises the device identifier; and
    requesting and acquiring the use license by using the transaction credential.

13. A digital artwork management method, comprising:
    generating a use license and sending the use license to a requesting device,
    wherein the use license comprises a device identifier of the requesting device, a content identifier of an encrypted file, and a first content key ciphertext obtained by encrypting a content key by using a device public key, and the content key corresponds to the encrypted file;

the device identifier is obtained by performing a hash operation with an international mobile equipment identity, a product serial number, or a media access control address, of the requesting device.

14. The digital artwork management method according to claim 13, further comprising:

receiving a transaction request of the requesting device, generating a transaction credential according to the transaction request, and sending the transaction credential to the requesting device, wherein the transaction request comprises the device identifier, and the transaction credential comprises the device identifier.

15. The digital artwork management method according to claim 14, further comprising:

receiving the transaction credential from the requesting device, and verifying a transaction credential digital signature in the transaction credential.

16. The digital artwork management method according to claim 13, wherein generating the use license comprises:

acquiring a second content key ciphertext obtained by encrypting the content key by using a service public key, and decrypting the second content key ciphertext by using a service private key corresponding to the service public key so as to obtain the content key; and encrypting the content key by using the device public key so as to obtain the first content key ciphertext, thereby obtaining the use license.

17. An electronic device, comprising:
a processor; and
a memory, comprising one or more computer program modules, wherein the one or more computer program modules are stored in the memory and configured to be executed by the processor, and the one or more computer program modules comprise instructions for implementing the digital artwork management method according to claim 9.

18. An electronic device, comprising:
a processor; and
a memory, comprising one or more computer program modules, wherein the one or more computer program modules are stored in the memory and configured to be executed by the processor, and the one or more computer program modules comprise instructions for implementing the digital artwork management method according to claim 13.

19. The digital artwork management method according to claim 13, further comprising:

receiving an application of the requesting device, and assigning the device identifier and a device public-private key pair that are corresponding to the requesting device, wherein the device public-private key pair comprises the device public key and a device private key corresponding to the device public key.

20. The digital artwork management method according to claim 10, further comprising:

applying for the device identifier and a device public-private key pair, wherein the device public-private key pair comprises the device public key and the device private key.

* * * * *